Patented Nov. 4, 1947

2,430,268

UNITED STATES PATENT OFFICE 2,430,268

N-PYRRYL ALKANOL ESTERS OF BENZOIC ACIDS

Souren Avakian, Oreland, Pa., assignor to The National Drug Company, Philadelphia, Pa., a corporation of Pennsylvania No Drawing. Application June 19, 1946, Serial No. 677,899

5 Claims. (Cl. 260—313)

This invention relates to benzoates of a dialkylpyrrole, and more particularly refers to N-alkylbenzoates of a dialkylpyrrole.

It is an object of this invention to produce a new class of pyrrole derivatives having a variety of uses in the industrial arts and in particular in the pharmaceutical field. A further object is to produce benzoates of dialkylpyrroles. A still further object is to produce N-alkylbenzoates of a dialkylpyrrole. Additional objects will become apparent from a consideration of the following description and claims.

These objects are obtained in accordance with the present invention wherein N-alkanol derivatives of alkyl pyrroles are reacted with ring-substituted benzoyl chlorides. In the case of 2,5-dimethylpyrryl derivatives these may be produced by reacting an alkanolamine and acetonylacetone after which the resulting 2,5-dimethylpyrryl derivative is reacted with the desired ring-substituted benzoyl chloride.

The invention may be more readily understood by a consideration of the following illustrative examples.

EXAMPLE

*Beta-(2,5-dimethylpyrryl) - N-ethyl-para-aminobenzoate*

30.5 grams of ethanol amine was added slowly to 57 grams of acetonylacetone in 300 cc. of absolute ethyl alcohol containing 3 drops of acetic acid. The reaction mixture was refluxed for 3 hours and then distilled under reduced pressure. 2,5-dimethyl-N-(beta-hydroxyethyl)-pyrryl was obtained. It distilled at 85–87° C./13 mm., solidified on standing, and melted at 52–53° C. after one crystallization from petroleum ether.

A solution of 27.8 grams of 2,5-dimethyl-N-(betahydroxyethyl)-pyrryl in 100 cc. of dry benzene was added slowly to a mixture of 37.1 grams of para-nitrobenzoyl chloride and 16 grams of pyridine dissolved in 300 cc. of dry benzene. The mixture was refluxed for 2 hours, cooled, extracted with sodium carbonate solution, and the benzene layer dried over sodium sulfate. The solvent and traces of pyridine were distilled over reduced pressure and the residue recrystallized from ethyl alcohol. Pure beta-(2,5-dimethylpyrryl)-N-ethyl-para-nitrobenzoate was obtained. It melted at 121–122° C.

10 grams of the foregoing nitro compound was dissolved in 150 cc. of absolute alcohol and reduced at 40 lbs. pressure with Raney nickel as a catalyst. The solution was filtered while hot and the filtrate cooled under tap water. The product — beta-(2,5-dimethylpyrryl)-N-ethyl-para-aminobenzoate—separates in almost quantitative yield. Its melting point was 173–175° C. Repeated crystallizations failed to change this melting point.

The above example was repeated, but in place of para-nitrobenzoyl chloride an equivalent amount of para-methoxybenzoyl chloride was used, and the final hydrogenation step was omitted. The product was the para-methoxybenzoate instead of the para-aminobenzoate.

In the same manner, other derivatives of benzoyl chloride may be employed. Likewise, other derivatives of pyrrole may be utilized.

Among the pyrrole compounds which are contemplated for use herein may be mentioned those containing one or more alkyl groups such as the methyl, ethyl and propyl derivatives. These groups may be substituted on the 3,5-position or on the 2,5- or 3,4-positions in the case of dialkyl derivatives. In the case of mono-substituents they may occupy any of the positions on the pyrrole ring. It is also contemplated that other substituents may be substituted on this ring in place of or in addition to the foregoing alkyl groups.

The N-substituent on the pyrryl radical is advisably a beta-hydroxyethyl group, although it is to be understood that other hydroxyalkyl groups may be used and these groups may, if desired, be further substituted. Among a representative group of such substituents may be mentioned the hydroxy methyl, the hydroxy propyl, etc., groups.

In the case of the benzoyl chloride, it may, as previously stated, be substituted with additional groups on the benzene ring. Such groups are advisably alkyl, alkoxy, nitro and amino groups, although the invention is not confined thereto.

The preferred compounds embraced within this invention are derivatives of 2,5-dimethylpyrrole, and in particular the N-ethylbenzoates of 2,5-dimethylpyrrole.

The compounds of this invention are useful for a variety of purposes. They may be employed as intermediates or as surface-active agents, or in pharmaceutical preparations. In particular, they are of value as local anesthetics, and in this connection, their solutions may be injected in the customary manner or they may be incorporated in ointments, tablets, etc., for convenient administration.

As many apparently widely different embodiments of this invention may be made without departing from the spirit and scope hereof, it is to be understood that the invention is not limited to the specific embodiments hereof except as defined in the appended claims.

I claim:

1. A benzoate of an N-pyrryl alkanol.
2. A benzoate of an N-dialkyl-pyrryl alkanol.
3. A benzoate of an N-2,5-dimethylpyrryl alkanol.
4. A benzoate of beta-N-2,5-dimethylpyrryl ethyl alcohol.
5. The para-amino-benzoate of beta-N-2,5-dimethylpyrryl ethyl alcohol.

SOUREN AVAKIAN.

REFERENCES CITED

The following references are of record in the file of this patent:

Beilstein, Vierte Auflage, Band XX, page 174 (citing: German Patent 116,335, Dec. 1, 1900).